INVENTOR.
Leonard A. Carbary
BY
Harness, Talburtt, & Baldwin
ATTORNEYS

United States Patent Office 3,548,251
Patented Dec. 15, 1970

3,548,251
DUAL INTENSITY TURN SIGNAL INDICATORS
Leonard A. Carbary, Fraser, Mich., assignor to Chrysler Corporation, Highland Park, Mich., a corporation of Delaware
Filed Apr. 10, 1969, Ser. No. 814,960
Int. Cl. B60q 1/38
U.S. Cl. 315—77          8 Claims

ABSTRACT OF THE DISCLOSURE

A turn signal system featuring dual intensity turn signal indicators and including selectively enabled circuit means in parallel with the turn signal indicator lamps for effecting a reduction in the intensity thereof.

BACKGROUND

This invention relates to vehicle turn signal indicator systems, and, more particularly, to circuit means enabling dual intensity operation of the turn signal indicator lamps thereof.

Prior forms of dual intensity vehicle lighting systems customarily employ dimming resistors, which are inserted in series with the lamp or lamps to be dimmed through the use of additional operating controls for shorting or shunting the dimming resistance when the lamp or lamps are to be operated at full intensity. Apart from the disruption of the vehicle wiring circuitry, the use of such additional operating controls for insertion and removal of the serially connected dimming resistance in the energization circuit of the lamps increases the cost and complexity of the system.

Accordingly, the present invention has for its object to provide an improved, simple and inexpensive form of multiple intensity lighting circuit.

Another object is to provide a simple, effective controller for a vehicle turn signal system having turn signal indicator lamps that are selectively operable by the controller at a reduced intensity illumination output level.

Another object is to provide a turn signal indicator system for a vehicle equipped with turn signal indicator lamps in which the intensity of the turn signal indicator lamps is controlled from a lamp intensity affecting network or circuit means connected in parallel with an existing vehicle lighting circuit.

Another object is to provide dual intensity indicators for a vehicle turn signal system that uses the existing controls provided on a vehicle to enable and disable the intensity affecting means for the intensity controlled lighting circuit.

SUMMARY

In accordance with the invention as applied to a vehicle turn indicator system, a voltage drop developing circuit comprising a series combination of a pair of resistors of different resistance values is connected in parallel with a vehicle lighting circuit and an electric circuit connection is extended from the junction of the resistors to the low potential side of the turn signal indicator lamps which are connected in parallel with the turn signal lamps. The voltage divider circuit is enabled or effective to reduce the intensity of the turn signal indicator lamps when the vehicle lighting circuit is energized through a preexisting light control switch provided for the lighting circuit.

The invention, both as to its organization and principles of operation will best be understood from consideration of the detailed description of the circuit embodiments of the invention made with reference to the accompanying drawings.

DESCRIPTION OF CIRCUIT EMBODIMENTS

Figure 1:
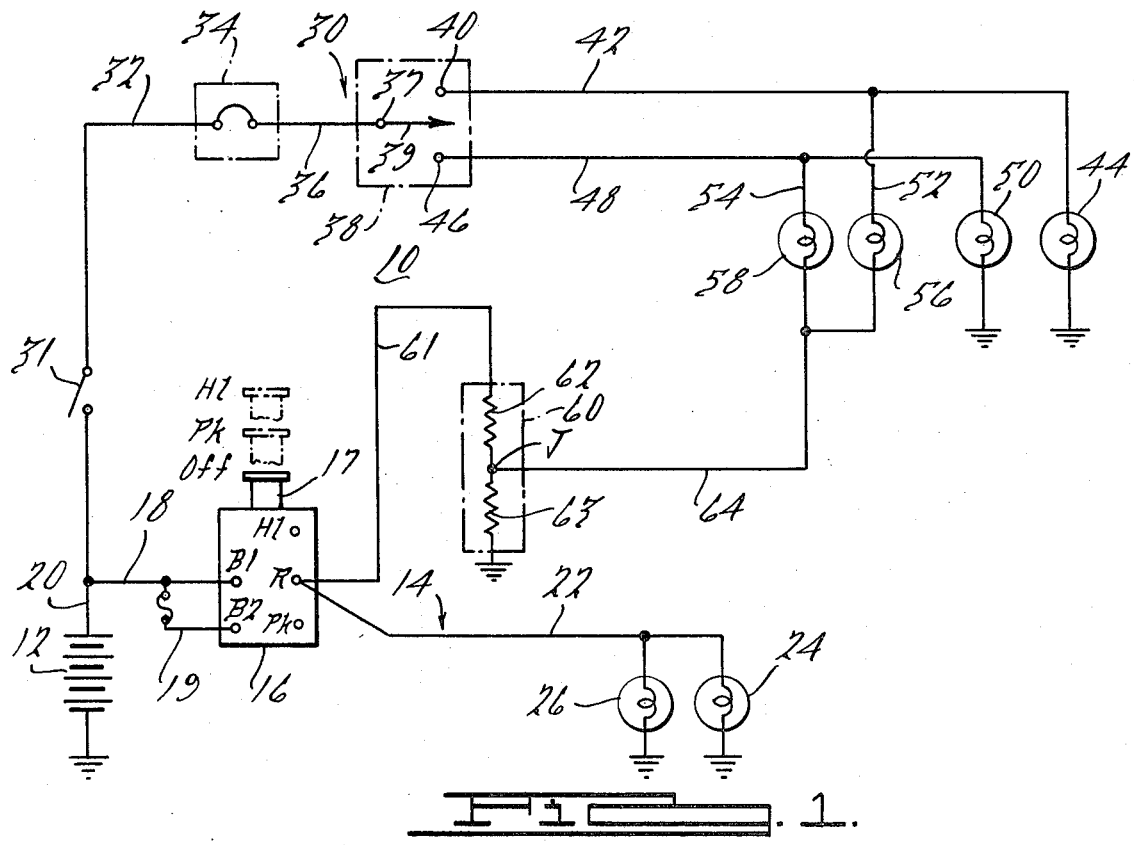
FIG. 1 is a schematic electric circuit diagram of a vehicle turn signal system equipped with dual intensity turn signal indicator lamps in accordance with the present invention.

With reference to the drawings, FIG. 1 illustrates a portion of a vehicle lighting and turn signal indicator circuit 10 energizable from a source of electric power which includes the vehicle storage battery 12, connected for a negatively grounded electrical system. The lighting circuit is shown, for example, as the vehicle rear or tail lighting circuit 14, which is energized from the vehicle battery through the vehicle main light control switch 16.

The light control switch 16 may be the conventional operator controlled multiple position switch customarily provided on automotive vehicles and is operated by an actuator 17 from an Off position through an intermediate Park position, P$k$, to a Headlights On position H$l$. The switch, which may contain an internal circuit breaker, is shown connected over conductor 18 and fused conductor 19 from the input or line terminals B1 and B2 thereof to conductor 20, which is connected to the positive terminal of the battery. The output or load connected terminals of the switch include a headlight circuit terminal H$l$, a parking light circuit terminal P$k$ and a rear or tail light circuit terminal R of which only the vehicle tail light circuit 14 is shown. The tail light circuit extends from switch terminal R over conductor 22 to the vehicle tail lamps 24 and 26 which are returned to ground and are energized when the switch 16 is in either the Park or Headlights position.

The turn signal circuit 30 is shown connected to the positive terminal of the battery 12 through the vehicle ignition switch 31 and extends over conductor 32 to one side of a serially interposed or connected thermal flasher unit 34. The other side of the flasher unit is connected over conductor 36 to the input terminal 37 of the turn signal actuator switch 38, which is also provided with a pair of terminals 40 and 46. Input terminal 37 is connected to the movable arm 39 of the turn signal switch which is manually positioned by the operator from a neutral or circuit interrupting central position to either one or two output circuit completing positions in accordance with the direction of the turn intended by the operator. Output contact terminal 40 is connected over conductor 42 to the ungrounded terminal of the forwardly directed right front turn signal lamp 44 whose other side is returned to ground. Output contact terminal 46 of the turn signal switch 38 is shown connected over conductor 48 to the ungrounded side of the forwardly directed left front turn signal lamp 50 returned to ground. Conductors 52 and 54 are shown connected from conductors 42 and 48 to the high potential side of the vehicle turn signal indicator lamps 56 and 58 which are connected in parallel with their respective corresponding turn signal lamps 44 and 50.

It will be appreciated that the indicator lamps 56, 58 are operated at full illumination intensity during day or bring surrounding ambient lighting conditions. At night, however, the illumination output of these lamps may be so high as to annoy or distract the operator of the equipped vehicle. Therefore, the subject control and lamp intensity affecting or reducing system is provided to permit operation of such lamps at full intensity during day or high ambient light conditions and at reduced intensity for night or low surrounding light levels. As applied to a vehicle turn signal system, the invention provides a selectively operable or enabled lamp intensity affecting circuit arrangement which permits dual intensity operation of the affected lamp or lamps under the above-mentioned lighting conditions.

The intensity affecting the circuit comprises a three terminal voltage divider network 60, which is shown connected by conductor 61 to the rear or tail light circuit terminal R of the vehicle light control switch 16 and an electric circuit connection 64 from a point J on the divider to the low potential side of each of the turn signal indicator lamps 56 and 58. The divider network 60 comprises the resistors 62 and 63 of which one side of resistor 62 is connected to conductor 61 and its other side to resistor 63, which is returned to ground. Resistor 63 is connected in series with the turn signal indicator lamps 56 and 58 and also with the resistor 61. The series combination of the resistors 62 and 63 is connected in parallel with the vehicle rear tail light circuit, whereby resistor 62 is effectively placed in circuit for divider operation with resistor 63 whenever the vehicle tail light or rear lighting circuit is energized.

The values of resistors 62 and 63 are related to the total resistance of the individual turn signal indicator lamps 56 and 58 which may be standard incandescent #330 lamp bulbs having a resistance of approximately 175 ohms and yielding an effective candle power output of 0.5 cp. Illustrative values for resistors 62 and 63 may be approximately 9 ohms and 1 ohm respectively. Resistor 63, which is permanently connected in circuit with the lamp or lamps to be dimmed, has a resistance value of from two to three orders of magnitude less than the resistance of the lamps and about one order of magnitude less than its associated divider resistor 62 which in turn is about one to two orders of magnitude less than the resistance of the lamp or load affected thereby.

It will be noted that the value of reistor 63 is of such low and insignificant proportion in relation to the resistance of the indicator lamps 56 and 58 as to have little or no perceptible effect on the output thereof. That is, when the light control switch 16 is off and the tail light circuit is deenergized, as during daytime operating conditions, the current through the indicator lamps 56 and 58 will be a function primarily of the resistance of the lamps themselves. During low surrounding light level or nighttime driving conditions, with the light control switch 16 actuated to energize the tail lamp circuit, the current flow through now energized or enabled resistor 62 will be directed through resistor 63 and supply an additional increased amount or component of current through the latter resistor in addition to that flowing or directed therethrough from an energized one of the indicator lamps 56 or 58. Accordingly, the voltage drop across resistor 63 is increased, resulting in a reduction of the net voltage available to or appearing across the energized one of the turn signal indicator lamps.

By way of a quantitative comparison, with the tail lamp circuit off or deenergized, the total resistance of an indicator lamp circuit containing an energized one of the turn signal indicator lamps 56 or 58 and the resistor 63 will be 176 ohms using the aforementioned illustrative values. With a nominal regulated excitation voltage of say 14 volts, the total current drawn through the energized indicator lamp and resistor will be approximately 0.08 ampere, producing a voltage drop of 0.08 volt across the resistor 63 with the remaining 13.92 volts available across the lamp. The ratio $(V/V_1)$ of the voltage across the lamp to the total voltage will yield an effective candle power output of 0.982 or 98.2% of the full output of the lamp in accordance with the commonly employed candle power to voltage relationship $$C_p = \left(\frac{V}{V_1}\right)^{3.6}$$

With the tail lamp circuit on to enable the lamp intensity effecting circuit, resistor 62 is connected in parallel with the resistance of an energized one of the indicator lamps 56 or 58, and this parallel combination is connected in series with resistor 63. In such cases, the total equivalent circuit resistance of the parallel-series circuit combination will be 9.56 ohms, producing a current draw from the battery of 1.47 amperes and a corresponding voltage drop of 1.47 volts across resistor 63. The increased voltage drop across resistor 63 effectively reduces the total voltage available across the lamp 56 or 58 to 12.53 volts or 0.896 of the total voltage otherwise available thereacross. The candle power output will then be 68.2% of its full output rating and amount to a 30% reduction over the lamp output in the deenergized condition of the tail lamp circuit.

Figure 2:
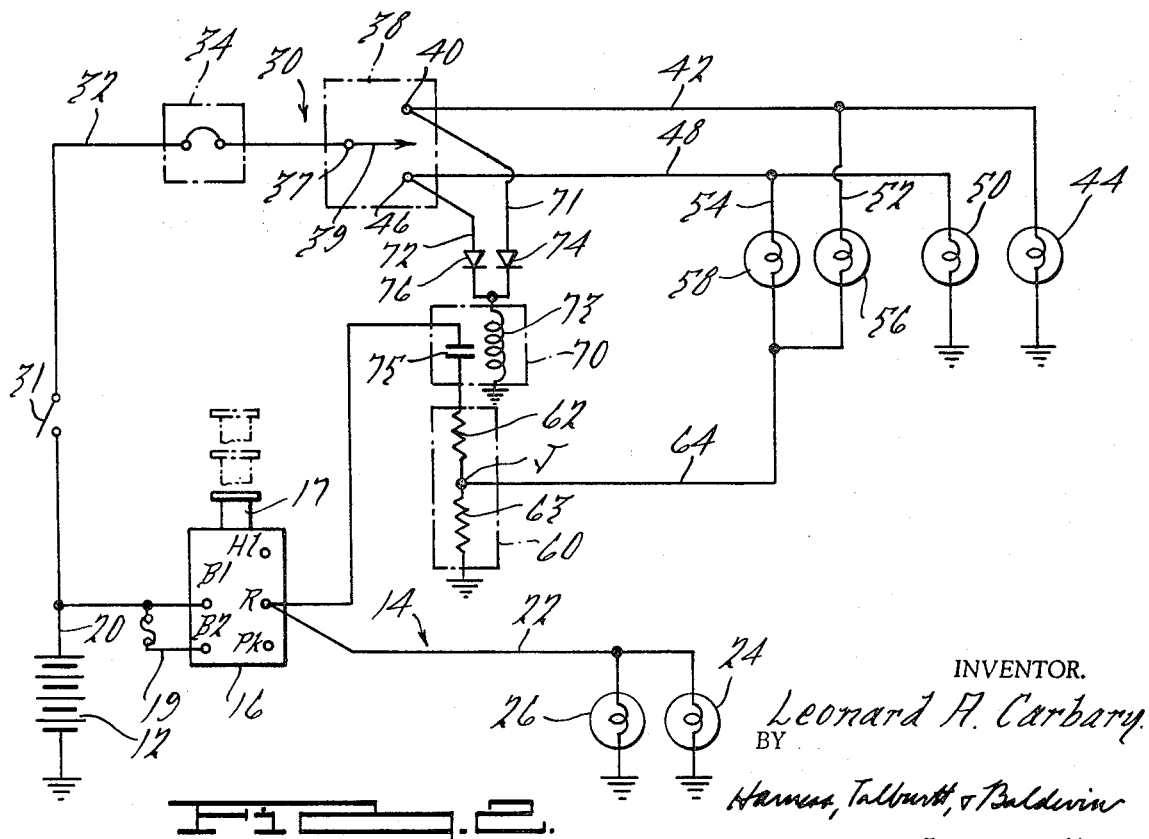
FIG. 2 is a form of lamp intensity affecting circuit under the joint control of the vehicle turn signal switch and a vehicle lighting control switch.

In FIG. 2, there is introduced an additional control relay element 70 which is connected in parallel from the output terminals 40 and 46 of the turn signal switch 38. A pair of circuit conductors 71 and 72 are connected through isolation diodes 74 and 76 to the control coil 73 of relay 70, which may be of a type similar to the horn relay employed in such vehicles. Whenever the turn signal switch 38 is actuated, the relay coil 73 is energized to close an associated set of normally open contacts 75 thereby to control the energization or flow current through the serial combination of the voltage divider resistors 62 and 63. During daytime operating conditions when the vehicle light control switch 16 is in its off position and the tail lamps are consequently deenergized, the turn signal indicator lamps 56 and 58 are operated at substantially full intensity levels. At night, however, when the switch 16 is actuated to energize the tail lighting circuit, and when the turn signal switch 38 is actuated to either of its contact circuit completing positions 40 or 46, the relay 70 is energized and the resistor 62, which is under the joint control of the switches 16 and 38, is effective or enabled to permit current draw through the voltage dividing network 60 and thus affect the voltage drop appearing across resistor 63 as described above.

I claim:

1. In a vehicle equipped with a source of electrical power, a lighting circuit including control means connecting the circuit to the source for energization therefrom, a turn signal circuit including a pair of turn signal lamps, a turn signal switch selectively operable between a pair of circuit completing contact positions to connect a selected one of said turn signal lamps to said source, and a pair of turn signal indicator lamps each connected at one side to a different one of said circuit contact positions of said turn signal switch, the combination therewith of circuit means for operating said turn signal indicator lamps at different intensities and comprising a series combination of a first and a second resistor connected to said control means in parallel with said lighting circuit, and a circuit connection from the junction of the resistors to the other side of each of said turn signal indicator lamps, whereby the voltage across and the effective candle power of the turn signal indicator lamps will be different depending upon the condition of actuation of said control switch.

2. The invention in accordance with claim 1 wherein said lighting circuit is the vehicle tail light circuit.

3. The invention in accordance with claim 1 above wherein the total resistance of the series combination of resistors is less than the resistance of a turn signal indicator lamp.

4. The invention in accordance with claim 1 wherein one of said resistors is connected in series with the other resistor and with the turn signal indicator lamps and wherein the other of said resistors is connected in parallel with the turn signal indicator lamps.

5. The invention in accordance with claim 4 above wherein the said one of the resistors is of insignificant resistance compared to the resistance of a turn signal indicator lamp and produces an imperceptible effect on the output of the lamp when exposed to the current through the lamp, but produces a significant voltage drop when exposed to the current through the other of said resistors and the current through the turn signal indicator lamp that reduces the voltage available to the lamp to reduce the output thereof.

6. The invention in accordance with claim 4 wherein the resistance of the said one of said resistors is about one order of magnitude less than that of the other resistor.

7. The invention in accordance with claim 6 above wherein the resistance of the said other one of said resistors is from one to two orders of magnitude less than the resistance of a turn signal indicator lamp.

8. A multiple intensity lamp circuit comprising a source of electrical power, a lamp having one side connected to one side of said power source, a first resistor connected to the other side of the lamp and the other side of said source, said resistor having a value considerably less than that of the lamp and imperceptibly affecting the intensity of the lamp when connected to the source, and a selectively operable intensity affecting circuit comprising selectively operable circuit completing control means connected to one side of the source, a second resistor of greater resistance value than said first resistor and of lesser resistance value than said lamp and connected at one side to the circuit completing side of said control means, and a circuit connection from the other side of said second resistor to the said other side of the lamp, said intensity affecting circuit operative upon operation of said control means to its circuit completing condition to supply an additional component of current flow through said first resistor from the series combination of both of said resistors and increase the voltage drop across the first resistor, thereby to reduce the voltage available to and appearing across the lamp.

References Cited

UNITED STATES PATENTS

| 3,196,311 | 7/1965 | Bleiweiss et al. | 315—77 |
| 3,244,934 | 4/1966 | Webb | 315—77 |
| 3,267,426 | 8/1966 | Parkes | 340—81 |
| 3,284,770 | 11/1966 | Bleiweiss et al. | 315—77X |

ROBERT SEGAL, Primary Examiner

C. R. CAMPBELL, Assistant Examiner

U.S. Cl. X.R.

315—81, 306